(12) United States Patent
Furuya et al.

(10) Patent No.: US 8,992,239 B2
(45) Date of Patent: Mar. 31, 2015

(54) LEVER FITTING-TYPE CONNECTOR

(75) Inventors: Yoshinobu Furuya, Makinohara (JP);
Hirotaka Hasegawa, Makinohara (JP);
Hiroshi Fukuda, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/634,729

(22) PCT Filed: Sep. 6, 2011

(86) PCT No.: PCT/JP2011/070235
§ 371 (c)(1),
(2), (4) Date: Sep. 13, 2012

(87) PCT Pub. No.: WO2012/033082
PCT Pub. Date: Mar. 15, 2012

(65) Prior Publication Data
US 2013/0017697 A1    Jan. 17, 2013

(30) Foreign Application Priority Data

Sep. 9, 2010    (JP) ................................ 2010-201746

(51) Int. Cl.
*H01R 13/62*    (2006.01)
*F23G 5/08*    (2006.01)
(Continued)

(52) U.S. Cl.
CPC ................ *F23G 5/085* (2013.01); *C03B 5/005* (2013.01); *C03B 5/06* (2013.01); *F23G 7/00* (2013.01);
(Continued)

(58) Field of Classification Search
CPC . H01R 13/639; H01R 13/641; H01R 13/4362
USPC .................. 439/157, 347, 489, 752, 595, 701
See application file for complete search history.

(56) References Cited

U.S. PATENT DOCUMENTS 5,810,612 A *    9/1998    Flask et al. .................... 439/157
6,540,532 B1    4/2003    Martin et al.
(Continued)

FOREIGN PATENT DOCUMENTS

FR    2889364 A1    2/2007
JP    08-130059 A    5/1996
(Continued)

OTHER PUBLICATIONS

International Search Report dated Dec. 6, 2011, issued for PCT/JP2011/070235.
(Continued)

*Primary Examiner* — Tulsidas C Patel
*Assistant Examiner* — Phuongchi T Nguyen
(74) *Attorney, Agent, or Firm* — Locke Lord LLP

(57) ABSTRACT

A lever fitting-type connecter of the present invention has housing having a main body and a pair of projections; a lever having holes into which the projections are inserted, the lever rotated in a state that the projections are inserted into the holes from a non-fitting position before being fitted to another connector to a fitting position fitted to the other connector by rotating around the projection; an engagement receiving portion arranged in the projection so as to sandwich the lever between the main body and the engagement receiving portion; a first overlapping position arranged in the lever and overlapped with the engagement receiving portion at the non-fitting position; a second overlapping position arranged in the lever and overlapped with the engagement receiving portion at the fitting position; and an engaging portion arranged between the first and second overlapping positions and engaged to the engagement receiving portion.

3 Claims, 9 Drawing Sheets

(51) Int. Cl.
*C03B 5/00* (2006.01)
*C03B 5/06* (2006.01)
*F23G 7/00* (2006.01)
*F23J 1/08* (2006.01)

(52) U.S. Cl.
CPC ............... *F23J 1/08* (2013.01); *F23G 2202/20* (2013.01); *F23G 2204/201* (2013.01); *F23G 2209/18* (2013.01)
USPC .......................................................... 439/157

(56) References Cited

U.S. PATENT DOCUMENTS

2006/0116018 A1   6/2006   Testa et al.

2011/0117761 A1*   5/2011   Loncar et al. ................. 439/157

FOREIGN PATENT DOCUMENTS

| | | |
|---|---|---|
| JP | 2003-100385 A | 4/2003 |
| JP | 2008-288052 A | 11/2008 |
| KR | 20090002260 U | 3/2009 |
| KR | 20100070832 A | 6/2010 |

OTHER PUBLICATIONS

Supplementary European Search Report dated Dec. 20, 2013, issued for the European patent application No. 11823557.1.

* cited by examiner

LEVER FITTING-TYPE CONNECTOR

TECHNICAL FIELD

The present invention relates to a lever fitting-type connector which is fitted to another connector by rotating the lever and approaching the other connector.

BACKGROUND ART

A connector as a conventional lever fitting-type connector is fitted to one connector, and provided in a power circuit breaker. The power circuit breaker is assembled to a power circuit for supplying power from a battery which is mounted in an electric vehicle to a load, and is opened and closed based on the power circuit. In an electric vehicle in which the above type conventional power circuit breaker is mounted, a capacity of power source which is a battery is large capacity compared to normal vehicle having a gasoline engine. For this reason, the power circuit breaker is installed in the vehicle with a condition that the power circuit is opened (namely, power to the power circuit is lost) so as to secure work safety. (For example, see Patent Document 1).

As shown in FIG. 11, the conventional power circuit breaker 110 includes a connector 101 as a lever fitting-type connector and another connector 102. The connector 101 includes a housing 104 having a main body 140 receiving a terminal (not shown) and a pair of rotation shafts 145 projecting from the main body 140, and a lever 105 which is able to rotate around the rotation shaft 145 and has a pair of holes 152 into which the rotation shafts 145 are inserted. The other connector 102 is fitted to the housing 104 along the Z direction by rotating the lever 105 and approaching the housing 104.

Also, FIG. 11 is a perspective view showing a conventional power circuit breaker, and is a view showing a state that a connector constructing the power circuit breaker is fitted to the other connector. FIG. 12 is a perspective view showing a state that the lever 105 constructing the connector shown in FIG. 11 is positioned in a non-fitting position before rotating the lever 105 toward the housing 104 constructing the connector. FIG. 13 is a side view showing the housing constructing the connector shown in FIG. 12. FIG. 14 is a perspective view showing the enlarged housing shown in FIG. 13. FIG. 15 is a perspective view showing the lever constructing the connector shown in FIG. 12.

As shown in FIGS. 12 and 13, the above connector 101 has a lock portion 146 which is arranged in the housing 104 along with the rotation shaft 145, and a lock receiving portion 159 which is arranged in the lever 105 along with the hole 152 and in which the lock portion 146 is guided so that the lever 105 is maintained in the non-fitting position before rotating it against the housing 104 (that is, a state that the power circuit is opened). Furthermore, when the lever 105 is positioned in the non-engagement, the lock portion 146 is inserted into the lock receiving portion 159 in a state that each hole 152 arranged in the lever 105 is passed in the pair of the rotation shafts 145 arranged in the housing 104.

As shown in FIG. 14, the above lock portion 146 has a projection 147 projecting from the main body 140 and a U-shaped groove 146a formed in a peripheral wall 140A constructing the main body 140. Furthermore, the lock portion 146 is elastically deformed toward a projecting direction (namely, the X direction) in which the rotation shaft 145 projects, and is formed.

CITATION LIST

Patent Literature

[PTL 1]
Japanese Published Patent Application No. 2003-100385

SUMMARY OF INVENTION

Technical Problem

In the above conventional lever fitting-type connector 101, there is a problem described below. More specifically, in order to safely and smoothly perform work for installing the connector in the vehicle, the lock portion 146 in the conventional lever fitting-type connector 101 is provided in the lever fitting-type connector so as to maintain the lever 105 against the housing 104 in the non-fitting position. However, by arranging the lock portion 146, there is a problem such that size of the connector becomes large in a direction (the Y direction) that the rotation shaft 145 and the lock portion 146 are arranged in line.

Accordingly, the present invention is to provide a lever fitting-type connector which can reduce the size thereof.

Solution to Problem

In order to overcome the above problems and attain the object, the present invention claimed in claim 1 is to provide a lever fitting-type connector comprising: a housing having a main body receiving a terminal and a pair of projections projecting from the main body; a rotatable lever having holes into which the pair of the projections is inserted respectively, the lever being rotated in a state that the projections are inserted into the holes from a non-fitting position before being fitted to another connector to a fitting position approaching the housing and fitted to the other connector by rotating around the projection; an engagement receiving portion arranged in the projection and extending from the projection so as to sandwich the lever between the main body and the engagement receiving portion; a first overlapping position arranged in the lever and overlapped with the engagement receiving portion at the non-fitting position; a second overlapping position arranged in the lever and overlapped with the engagement receiving portion at the fitting position; and an engaging portion arranged between the first overlapping position and the second overlapping position, projecting from the lever, and engaged to the engagement receiving portion.

According to the present invention claimed in claim 2, there is provided the lever fitting-type connector as claimed in claim 1, wherein a straight guide groove communicated with the hole is arranged in the lever, and a pair of second projections entering into the guide groove at the fitting position is arranged in the main body.

According to the invention claimed in claim 3, there is provided the lever fitting-type connector as claimed in claim 2, further comprising: an abutting portion projecting toward a direction away from the other connector and arranged between the second projection and the projection in the main body; and a pair of abutment receiving portions arranged in the lever and elastically deformed in the direction away from the other connector, wherein when the lever is positioned in the fitting position, the pair of the abutment receiving portions is arranged in a front side of the abutting portion of a sliding direction in which the second projection and the projection are lined up, and then when the lever is slid along the sliding direction, the abutment receiving portion abuts on the abutting portion.

According to the invention claimed in claim 4, there is provided the lever fitting-type connector as claimed in claim 3, wherein when the pair of the abutment receiving portions is positioned in a back side of the sliding direction of the abutting portion, the second projection is positioned in an end portion of the guide groove away from the hole.

Advantageous Effects of Invention

According to the present invention recited in claim 1, the lever fitting-type connector has a housing having a main body receiving a terminal and a pair of projections projecting from the main body; a rotatable lever having holes into which the pair of the projections is inserted respectively, the lever being rotated in a state that the projections are inserted into the holes from a non-fitting position before being fitted to another connector to a fitting position approaching the housing and fitted to the other connector by rotating around the projection; an engagement receiving portion arranged in the projection and extending from the projection so as to sandwich the lever between the main body and the engagement receiving portion; a first overlapping position arranged in the lever and overlapped with the engagement receiving portion at the non-fitting position; a second overlapping position arranged in the lever and overlapped with the engagement receiving portion at the fitting position; and an engaging portion arranged between the first overlapping position and the second overlapping position, projecting from the lever, and engaged to the engagement receiving portion. Therefore, the lever can be held in the non-fitting position even if the lock portion formed in the conventional lever fitting-type connector is not arranged. Thus, the lever fitting-type connector reducing the size thereof can be provided.

Furthermore, since it is not required to arrange the lock portion which is arranged in the conventional lever fitting-type connector in the lever fitting-type connector, work process (time) and material so as to form the projection projecting from the main body and the U-shaped groove formed in the peripheral wall of the main body in the lock portion of the conventional lever fitting-type connector is reduced. Therefore, cost can be reduced.

According to the present invention recited in claim 2, a straight guide groove communicated with the hole is arranged in the lever, and a pair of second projections entering into the guide groove at the fitting position is arranged in the main body. Therefore, since the second projection 43 is entered into the guide groove, a worker can visually confirm positioning the lever at the fitting position. Thus, it is possible to prevent damage generated by a state that the connector and the other connector are incomplete from occurring. Furthermore, rotation returned to the non-fitting position from the fitting position can be regulated by entering the second projection into the guide groove.

According to the present invention recited in claim 3, the lever fitting-type connector further has an abutting portion projecting toward a direction away from the other connector and arranged between the second projection and the projection in the main body; and a pair of abutment receiving portions arranged in the lever and elastically deformed in the direction away from the other connector, wherein when the lever is positioned in the fitting position, the pair of the abutment receiving portions is arranged in a front side of the abutting portion of a sliding direction in which the second projection and the projection are lined up, and then when the lever is slid along the sliding direction, the abutment receiving portion abuts on the abutting portion. Thus, sliding the lever along the sliding direction can be controlled.

According to the present invention recited in claim 4, when the pair of the abutment receiving portions is positioned in a back side of the sliding direction of the abutting portion, the second projection is positioned in an end portion of the guide groove away from the hole. Thus, the lever 5 is slid along the sliding direction in which the second projection and the projection are arranged in a line with a state that the lever is positioned in the fitting position against the housing, and the abutment receiving portion is positioned in the fitting completion position which is positioned in the back side of the sliding direction farther than the abutting portion. As a result, a worker can visually confirm positioning the second projection in the end portion of the guide groove away from the hole. Thus, damage before the lever is positioned in the fitting completion position against the housing can be prevented from occurring previously.

DESCRIPTION OF EMBODIMENTS

Hereafter, a power circuit breaker having a connector as a lever fitting-type connector according to an embodiment of the present invention will be explained with reference to FIGS. 1 to 10. The power circuit breaker 10 is installed in a power circuit for supplying power from a battery mounted in an electric vehicle to a load, and is opened and closed in the power circuit as necessary.

Figure 1:
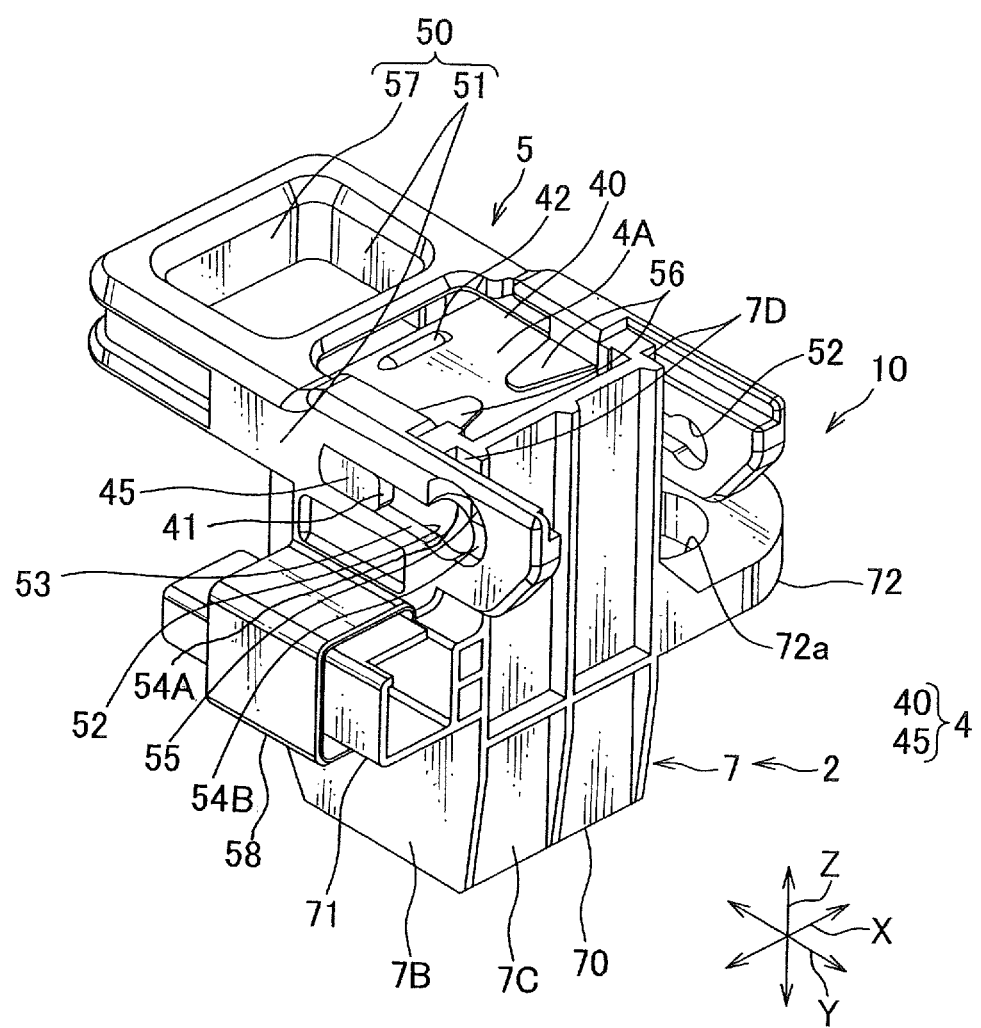
FIG. 1 is a perspective view showing a power circuit breaker having a connector according to one embodiment of the present invention.
Figure 2:
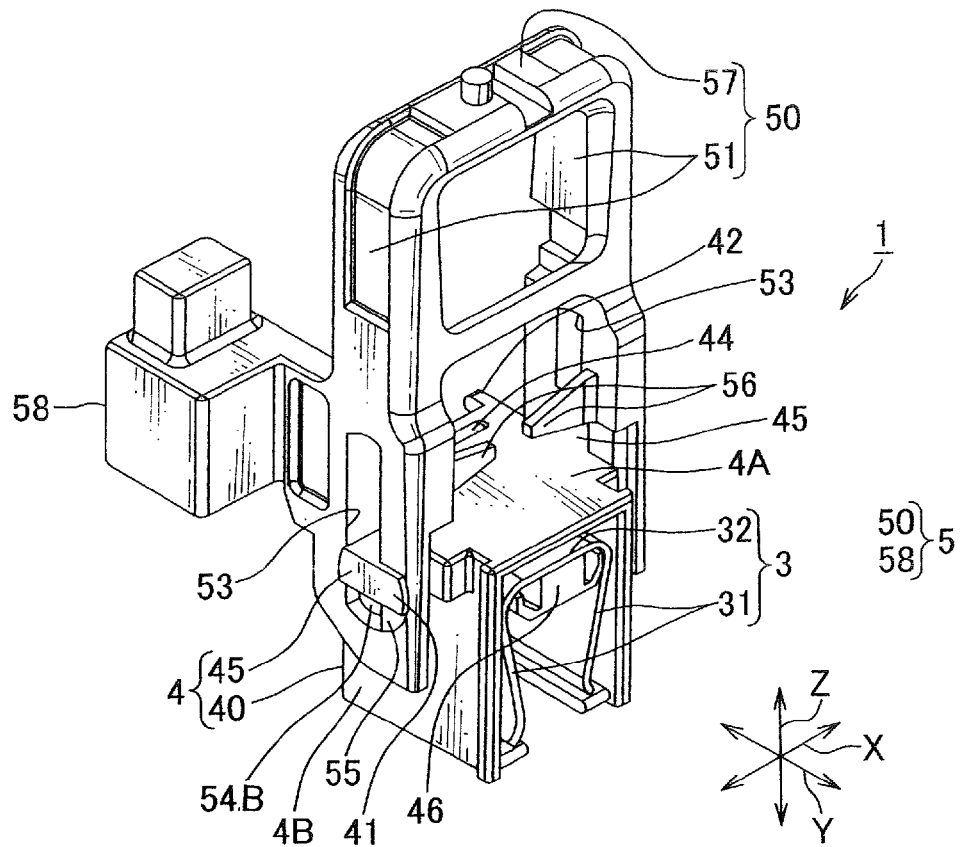
FIG. 2 is a perspective view showing the connector shown in FIG. 1.

As shown in FIGS. 1 and 2, the above power circuit breaker 10 includes a connector 1 as the lever fitting-type connector and another connector 2. The connector 1 has a female terminal 3 as a terminal, a housing 4 which is formed in a box shape and receives the female terminal 3, and a lever 5. The lever 5 is formed in a U-shape so that the housing 4 is sandwiched, and rotatably assembled in the housing 4. The other connector 2 is fitted to the housing 4 of connector 1 by rotating the lever 5.

Additionally, in this specification of the present invention, "non-fitting position" is a position before the connector 1 is fitted to the other connector 2, that is, before the lever 5 is rotated against the housing 4. As against the non-fitting position, "fitting position" described in the specification is a position that the connector 1 is fitted to the other connector 2, that is, that the lever 5 is rotated toward the housing 4. Furthermore, "fitting completion position" described in the specification is a position that the lever 5 is positioned by sliding the lever 5 against the housing 4 after the lever 5 is positioned in the fitting position.

Also, when the connector 1 is fitted to the other connector 2 (namely, the lever 5 is positioned in the fitting position), the power circuit is opened (namely, the power circuit is blocked). Furthermore, when the connector 1 is fitted to the other connector 2 and then the lever 5 is slid against the housing 4, the lever 5 is positioned in the fitting completion position. At this time, the power circuit is closed, namely, the power circuit is conducted.

The above female terminal 3 is manufactured by blanking or bending a conductive plate. Furthermore, the female terminal 3 is formed in a U-shape, and has a pair of connections 31 and a junction 32. In the connections 31, a male terminal 6 described below in the other connector 2 is inserted. The junction 32 is connected to the pair of the connections 31. The pair of the connections 31 is elastically deformed in a direction approaching each other, and the male terminal 6 is elastically connected between the pair of the connections 31.

Figure 3:
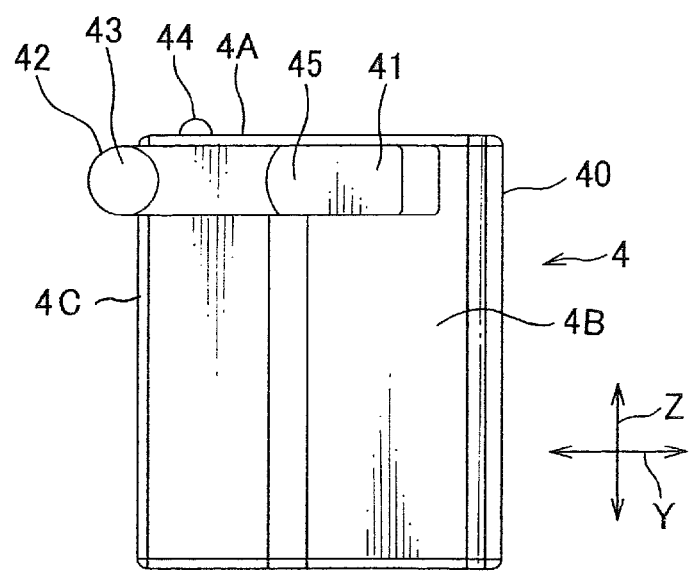
FIG. 3 is a side view of the housing constructing the connector shown in FIG. 2.
Figure 4:
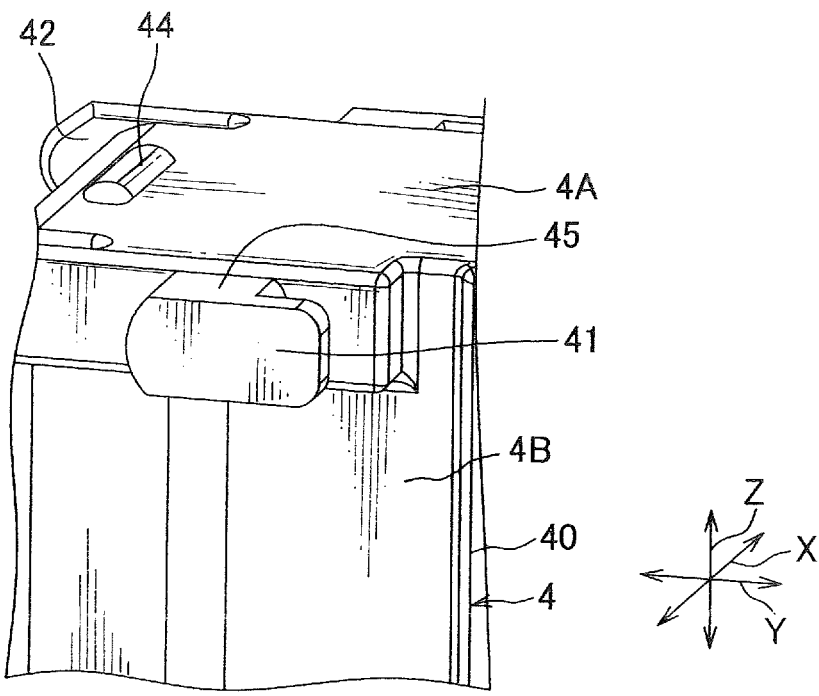
FIG. 4 is a perspective view showing the enlarged main part of the housing shown in FIG. 3.

As shown in FIGS. 3 and 4, the above housing 4 has a main body 40 and a pair of rotation shafts 45 as a projection (namely, the rotation shaft 45 corresponds to the projection in claims). The main body 40 has a ceiling wall 4A and a plurality of side walls 4B, 4C (4B: a pair of first side walls opposed to each other, 4C: second side wall) continuing to an edge of the ceiling wall 4A, and is formed in a box shape. Each the rotation shaft 45 projects from each the first side wall 4B, and is inserted into a hole 52 which is formed in the lever 5 and described below. That is, the pair of the rotation shafts 45 project from each the first side wall 4B of the main body 40. Furthermore, the main body 40 and the pair of the rotation shafts 45 are made of insulating resin, and formed by well-known injection molding together.

The above second side wall 4C has a terminal supporting member 46 projecting from the second side wall 4C. Between the terminal supporting member 46 and the ceiling wall 4A, the junction 32 of the female terminal 3 is sandwiched.

Also, the Z direction shown in FIG. 1 and so on indicates a fitting direction in which the connector 1 approaches the other connector 2 and is fitted thereto. The X direction indicates an opposing direction in which the pair of the first side walls 4B are opposed each other and a width direction of the ceiling wall 4A. The Y direction indicates a longitudinal direction of the ceiling direction 4A, a arrangement direction in which the rotation shaft 45 and a second projection 43 described below are arranged in line, and a sliding direction in which the lever 5 is slid toward the housing 4 after the lever 5 is positioned in the fitting position.

The main body 40 has a pair of engagement receiving portions 41, a pair of standing portions 42, a pair of second projections 43 arranged in each standing portions 42, and an abutting portion 44 projecting from the ceiling wall 4A. The engagement receiving portion 41 is extended from an end portion of the rotation shaft 45 away from the first side wall 4B of the main body 40 toward the back side of the sliding direction (namely, the Y direction). The standing portion 42 is arranged in an end portion of the ceiling wall 4A.

As shown in FIG. 4, the pair of the engagement receiving portions 41 is respectively inserted into the holes 52 which are formed in the lever 5, so that the lever 5 is sandwiched between the engagement receiving portions 41 and the first side wall 4B of the main body 40. That is, the engagement receiving portion 41 is spaced from the first side wall 4B of the main body 40 so as to sandwich the lever 5 between the engagement receiving portion 41 and the main body 40.

The pair of the standing portions 42 stands from the second side wall 4C along the sliding direction (namely, longitudinal direction, the Y direction), and is formed in a plate shape. Furthermore, the standing portions 42 are arranged in both end portions of the width direction (namely, the X direction) of the second side wall 4C.

The pair of the second projections 43 project along a direction (namely, the X direction) away from each standing portion 42. That is, the second projection 43 is arranged along with the rotation shaft 45 (namely, the Y direction). Furthermore, each second projection 43 is entered in a straight guide groove 53 (described below) which is arranged in the lever 5 and communicated with the hole 52. When the lever 5 is positioned in the fitting position and the second projection 43 is entered in the guide groove 53, the second projection 43 is positioned in a position spaced from an end portion of the guide groove 53 which is arranged in the lever 5 away from the hole 52. When the lever 5 is slid against the housing 4 and positioned in the fitting completion position after the lever 5 is positioned in the fitting position, the second projection 43 is positioned in the end portion of the guide groove 53 away from the hole 52.

The abutting portion 44 is arranged between the rotation shaft 45 and the second projection 43, and extended along the width direction (namely, the X direction).

Figure 5:
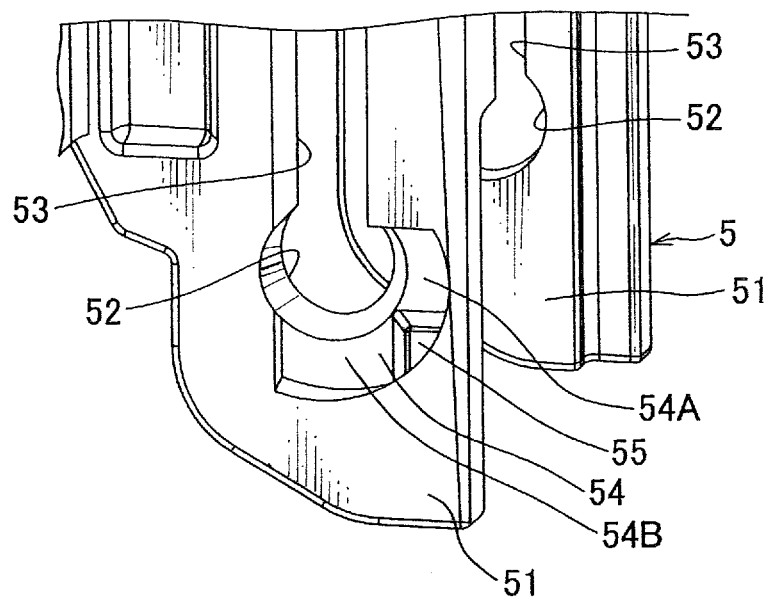
FIG. 5 is an enlarged view showing the main part of the lever constructing the connector shown in FIG. 2.
Figure 6:
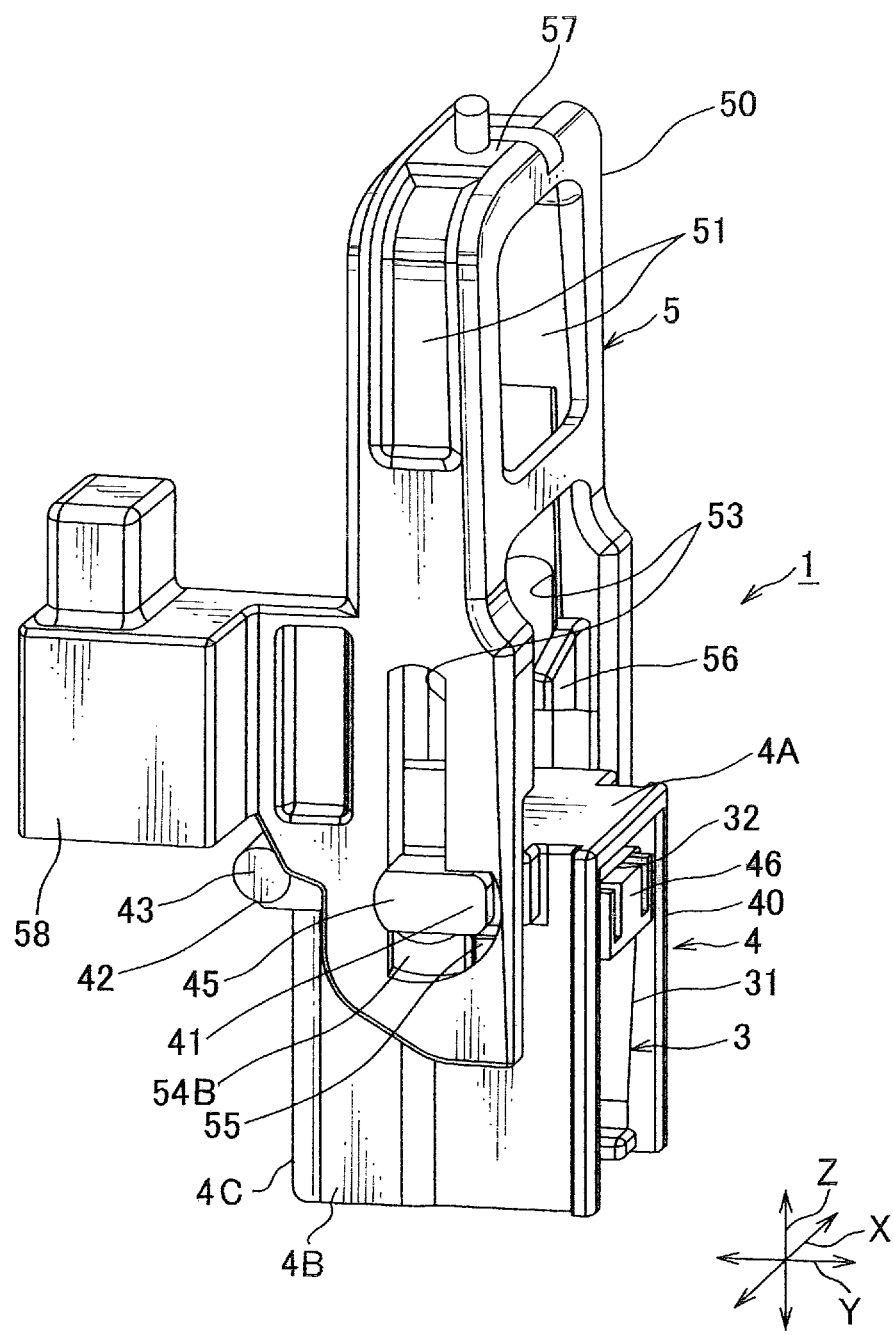
FIG. 6 is a perspective view showing the connector shown in FIG. 2.

As shown in FIGS. 5 and 6, the lever 5 has a lever main body 50 formed in a U-shape, an outside tube portion 58, and a conductive first detection terminal (not shown). The lever main body 50 includes a pair of plate portions 51 which are overlapped with the pair of the first side walls 4B arranged in the housing 4, and a junction 57 which connected with the pair of the plate portions 51. The outside tube portion 58 is arranged toward an outside direction of one of the pair of the plate portions 51. The first detection terminal is assembled inside of the outside tube portion 58. Furthermore, the lever main body 50 and the outside tube portion 58 are made of insulating resin, and formed by well-known injection molding together.

The pair of the plate portions 51 is elastically deformed in a approaching direction and a separating direction. Each the plate portion 51 has the hole 52, the guide groove 53, a rotation dent 54, an engagement portion 55, and a pair of abutment receiving portions 56. The rotation shaft 45 arranged in the housing 4 described above is inserted into the hole 52. The guide groove 53 communicated with the hole 52, and linearly formed from the hole 52 along the sliding direction (namely, the X direction). The rotation dent 54 is arranged in a circumference of the hole 52, and formed in an outer surface of the plate portion 51 with a dent shape. The engaging portion 55 is formed in a bottom portion of the rotation dent 54 with a projection shape. The abutment receiving portion 56 projects from the plate portion 51 toward a direction approaching each other.

When the lever 5 is rotated from the non-fitting position to the fitting position, the rotation dent 54 is provided in a locus of the engagement receiving portion 41 arranged in the housing 4.

As shown in FIG. 6, the engaging portion 55 is provided in the locus of the engagement receiving portion 41 between a first overlapping position 54A and a second overlapping position 54B. The first overlapping position 54A is overlapped with the engagement receiving portion 41 when the lever 5 is positioned in the non-fitting position. The second overlapping position 54B is overlapped with the engagement receiving portion 41 when the lever 5 is positioned in the fitting position.

One end of the abutment receiving portion 56 continues to the plate portion 51, and the other end thereof is free end. The abutment receiving portion 56 is elastically deformed in the fitting direction (namely, the Z direction) away from the other connector 2. Furthermore, the abutment receiving portion 56 abuts on the abutting portion 44 when the lever 5 is positioned in the fitting position and slid along the Y direction. In addition, the abutment receiving portion 56 is positioned on the near side of the abutting portion 44 in the sliding direction (namely, the Y direction) when the lever 5 is positioned in the fitting position against the housing 4. Further, the abutment receiving portion 56 is positioned on the far side of the abutting portion 44 in the sliding direction (namely, the Y direction) when the lever 5 is positioned in the fitting completion position against the housing 4.

The outside tube portion 58 is formed in a tube shape, and assembles the conductive first detection terminal inside thereof. Furthermore, the outside tube portion 58 is inserted into an inside tube portion 71 which is arranged in the other connector 2 described below when the lever 5 is positioned in the fitting completion position against the housing 4.

Figure 7:
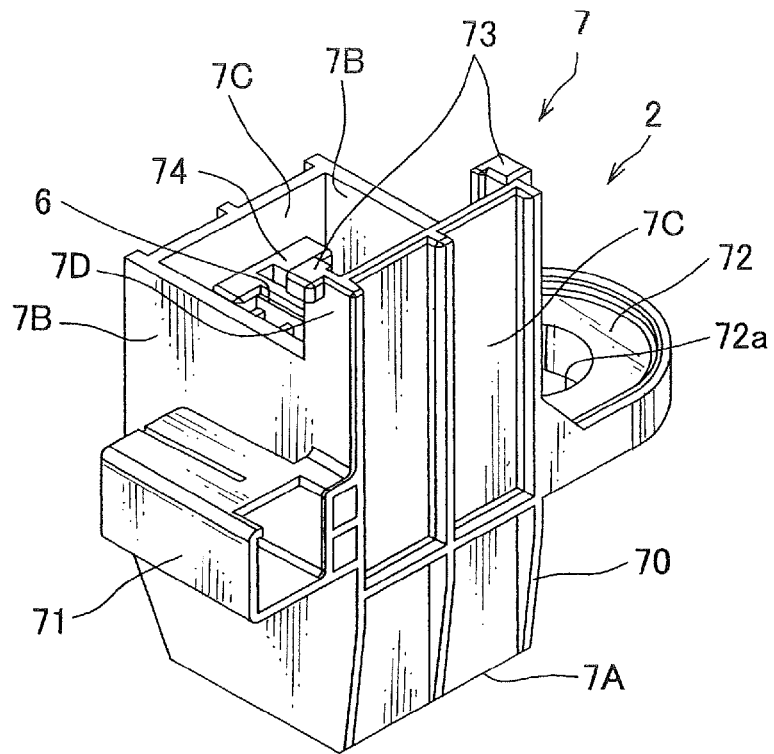
FIG. 7 is a perspective view showing another connector constructing the power circuit breaker shown in FIG. 1.

As shown in FIG. 7, the other connector 2 has a pair of male terminals 6 connected to the female terminal 3, a second housing 7 formed in a box shape so as to receive the male terminal 6, and a pair of second detection terminals (not shown) arranged in the lever 5 and connected by the first detection terminal.

The second housing 7 has a second main body 70 which receives the housing 4 arranged in the connector 1, an inside tube portion 71 which is received inside of the outside tube portion 58 arranged in the lever 5, and a vehicle body attaching portion 72 having a hole 72a which is overlapped with a vehicle body panel constructing the vehicle body so as to attach the other connector 2 to the vehicle body of the vehicle.

The second main body 70 has a bottom wall 7A, a pair of first outer walls 7B, and a pair of second outer walls 7C, and is formed in a bottomed cylinder shape. The bottom wall 7A is arranged in a position opposed to the ceiling wall 4A of the main body 40. Each the first outer wall 7A extends from an edge of the bottom wall 7A in the width direction (namely, the X direction), and is overlapped with each the first side wall 4B of the main body 50. The second outer wall 7C extends from an edge of the bottom wall 7A in the longitudinal direction (namely, the Y direction). One of the pair of the second outer walls 7C is overlapped with the second side wall 4C of the main body 40.

In the bottom wall 7A, a terminal attaching portion 74 for attaching the pair of the male terminals 6 is provided. The terminal attaching portion 74 extends from the bottom wall 7A, and is formed in a plate shape. Furthermore, the terminal attaching portion 74 is arranged between the pair of the male terminals 6, and the pair of the male terminals 6 are insulated each other.

Each the first outer wall 7B has a extending portion 7D which extends from the edge of the first outer wall 7B toward the connector 1 and continues to the other second outer wall 7C, and an abutment shaft 73 which is arranged in the extending portion 7D. In one of the first outer walls 7B, the inside tube portion 71 projects and is arranged. On the other hand, in the other thereof, the vehicle body attaching portion 72 projects and is arranged.

Figure 8:
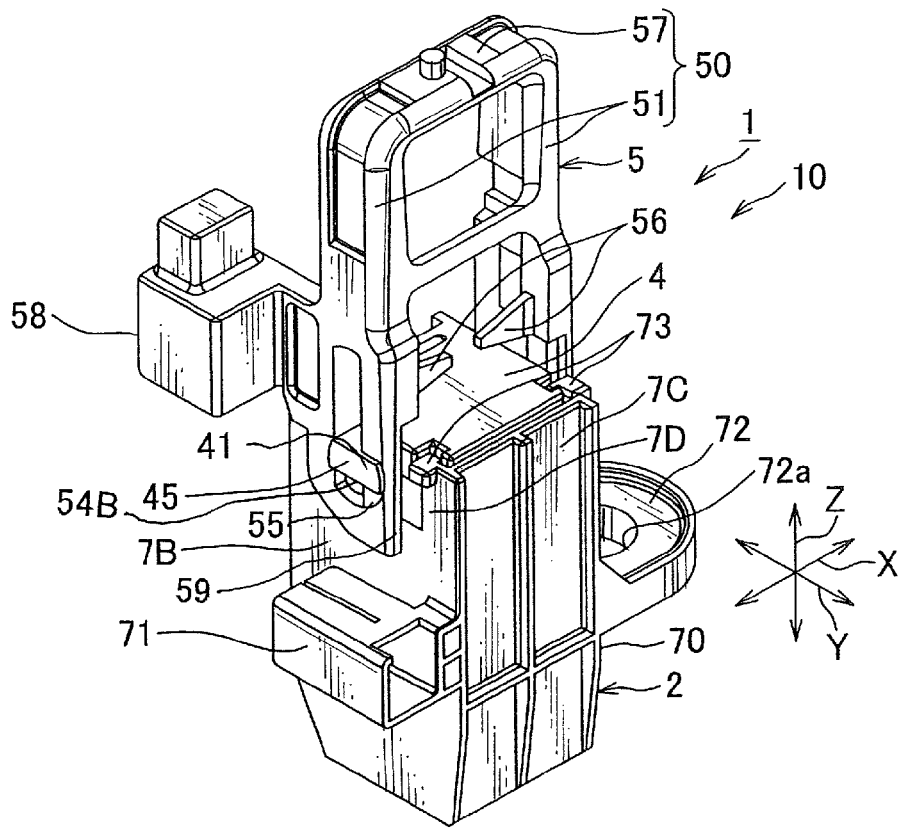
FIG. 8 is a perspective view showing a state that the connector shown in FIG. 2 is positioned in a non-fitting position before fitted to the other connector.

As shown in FIG. 8, the extending portion 7D is arranged in the end portion of the back side of the sliding direction (namely, the Y direction). When the housing 4 in which the female terminal 3 is received of connector 1 and the other connector 2 are approached each other, and the lever 5 is positioned in the non-fitting position before rotating it against the housing 4, the extending portion 7D is arranged in the back side of the rotation shaft 45 in the sliding direction (namely, the Y direction) along with the rotation shaft 45. That is, the extending portion 7D is positioned adjacent to the rotation shaft 45.

The abutting shaft 73 is arranged in the end portion of the extending portion 7D away from the first outer wall 7B, and projects toward a direction separating from each other (namely, the X direction). When the lever 5 positioned in the non-fitting position is rotated against the housing 4, the abutting shaft 73 is arranged in a position abutting on an outer edge of the plate portion 51 which is arranged in the lever 5. Furthermore, when the lever 5 is rotated in a state that the abutting shaft 73 abuts on an outer edge of the lever 5 (namely, a sliding groove 59), the lever 5 is rotated around the abutting shaft 73. As a result, by rotating the lever 5, the housing 4 of the connector 1 approaches the second housing 7 of the other connector 2, and is fitted thereto.

The inside tube portion 71 is formed in a tube shape having an opening arranged in the sliding direction (namely, the Y direction), and has a pair of second detection terminals inside.

The pair of the second detection terminals are arranged at intervals each other. Namely, the second detection terminals are provided away from each other. One of the second detection terminals is connected to the battery, and the other thereof is connected to the load. Furthermore, when the lever 5 is positioned in the fitting completion position, the first detection terminal connects the pair of the second detection terminals each other. As a result, the power circuit is closed, namely the power circuit is conducted.

An assembly process of the power circuit breaker 10 described above will be explained. First, the pair of male terminals 6 is connected to a power source and a pair of electric wires connected to each load, respectively. Furthermore, in order to attach the other connector 2 to the vehicle body panel of the vehicle body, the vehicle body attaching portion 72 of the other connector 2 is overlapped with the vehicle panel, and a volt is inserted into the hold 72a of the vehicle body attaching portion 72 and threadably mounted on a nut arranged in the vehicle body panel.

Next, the lever 5 is positioned in the non-fitting position before being rotated against the housing 4 as shown in FIG. 8. In this case, the rotation shaft 45 of the housing 4 is inserted into the hole 52 of the lever 5, and the engagement receiving portion 41 is overlapped with the first overlapping position 45A. Furthermore, the connector 1 in a state that the lever 5 is positioned in the non-fitting position against the housing 4 is positioned in a position that the ceiling wall 4A opposes to the bottom wall 7A of the other connector 2, and then the connector 1 is brought close to the other connector 2 so that the each the first side wall 4B is overlapped with each the first outer wall 7B.

Figure 9:
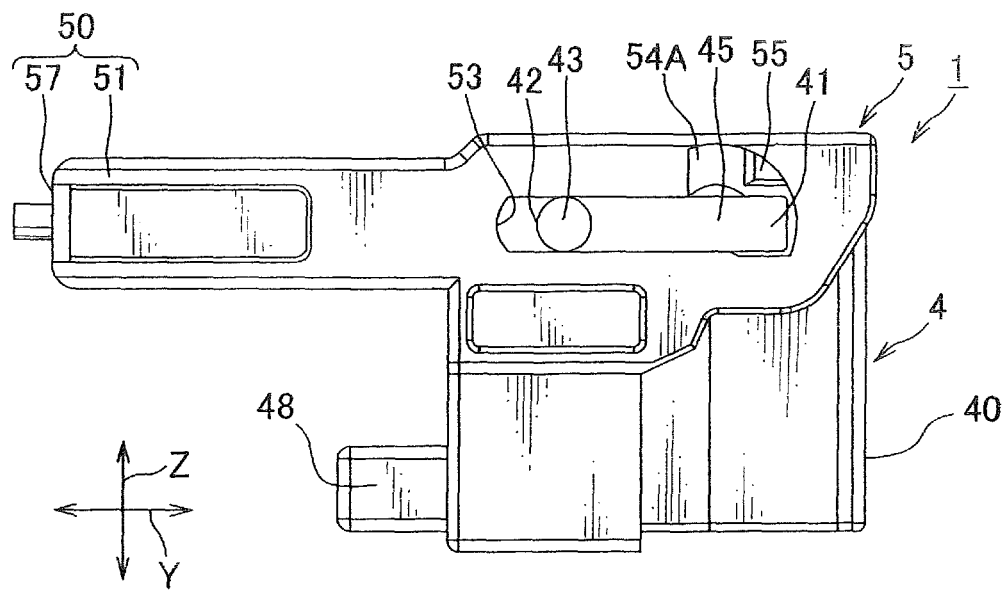
FIG. 9 is a side view showing a state that the connector shown in FIG. 2 is positioned in a fitting position fitted to the other connector.

In addition, the lever 5 is rotated against the housing 4 in a state that the connector 1 approaches the other connector 2. As a result, the engagement receiving portion 41 abuts on the engaging portion 55. When the lever 5 is further rotated, the engagement receiving portion 41 is arranged over the engaging portion 55. At the same time, the abutting shaft 73 of the other connector 2 abuts on the sliding groove 59 of the lever 5. In addition, when the lever 5 is further rotated in a state that the abutting shaft 73 abuts on the sliding groove 59, the lever 5 is rotated around the abutting shaft 73. As a result, the main body 40 of the housing 4 approaches the second main body 70 of the second hosing 7, and the main body 40 of the housing 4 is pressed inside of the second main body 70 of the second housing 7. Furthermore, the engagement receiving portion 41 is positioned in the second overlapping position 54B, and the second projection 43 is inserted into the guide groove 53. Additionally, each of the pair of the male terminals 6 is entered inside of the female terminal 3, the male terminal 6 is elastically connected to the female terminal 3, and the housing 4 of the connector 1 is received in the second housing 7 of the other connector 2. As a result, the connector 1 and the other connector 2 (namely, the female terminal 3 and the male terminal 6) are fitted each other, and the lever 5 is positioned in the fitting position as shown in FIG. 9.

Also, when the lever 5 is positioned in the fitting position, the second projection 43 is positioned in a position spaced from the end portion of the guide groove 53 arranged in the lever 5 away from the hole 52. Furthermore, when the lever 5 is positioned in the fitting position, the pair of the second detection terminals are not connected each other. For this reason, the power circuit is opened, as a result, a current flow in the female terminal 3 from the male terminal 6.

Figure 10:
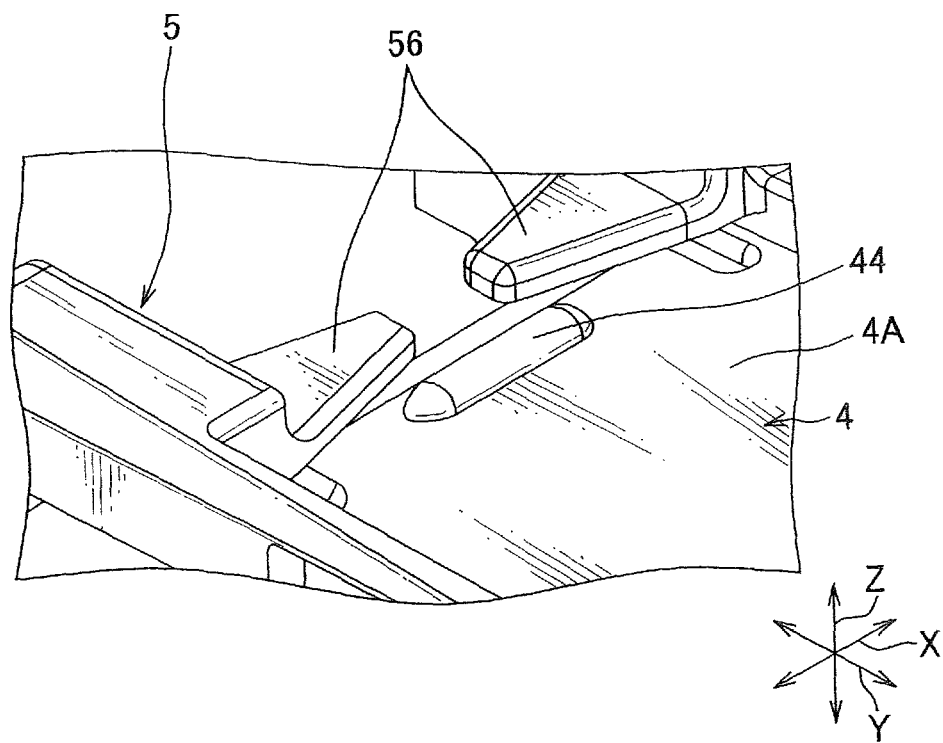
FIG. 10 is a perspective view showing the enlarged main part of the connector shown in FIG. 9.
Figure 11:
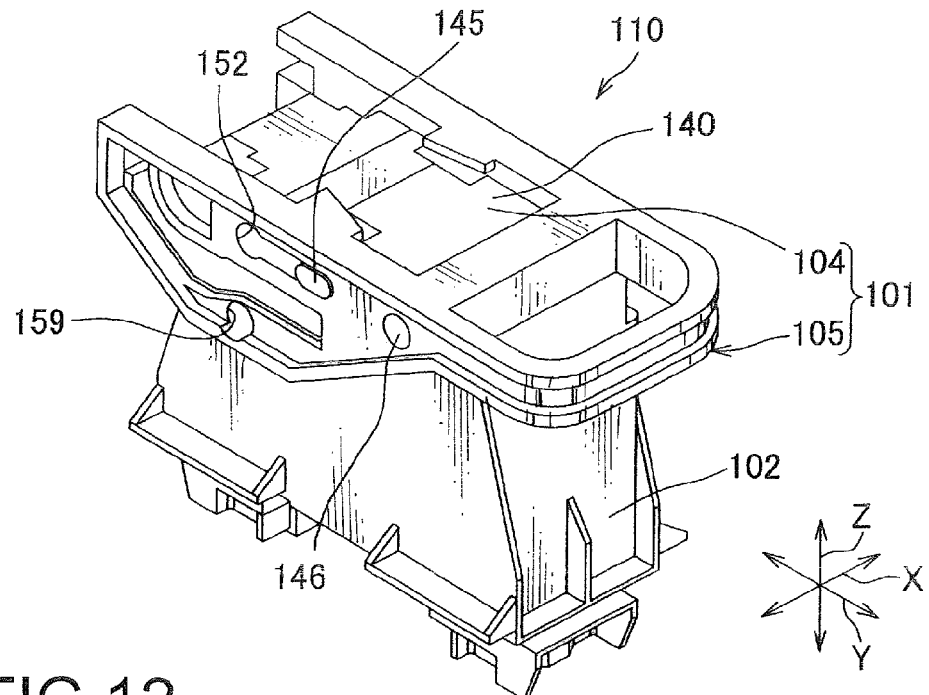
FIG. 11 is a perspective view showing the conventional power circuit breaker, and a view showing a state that the connector constructing the power circuit breaker is fitted to the other connector.
Figure 12:
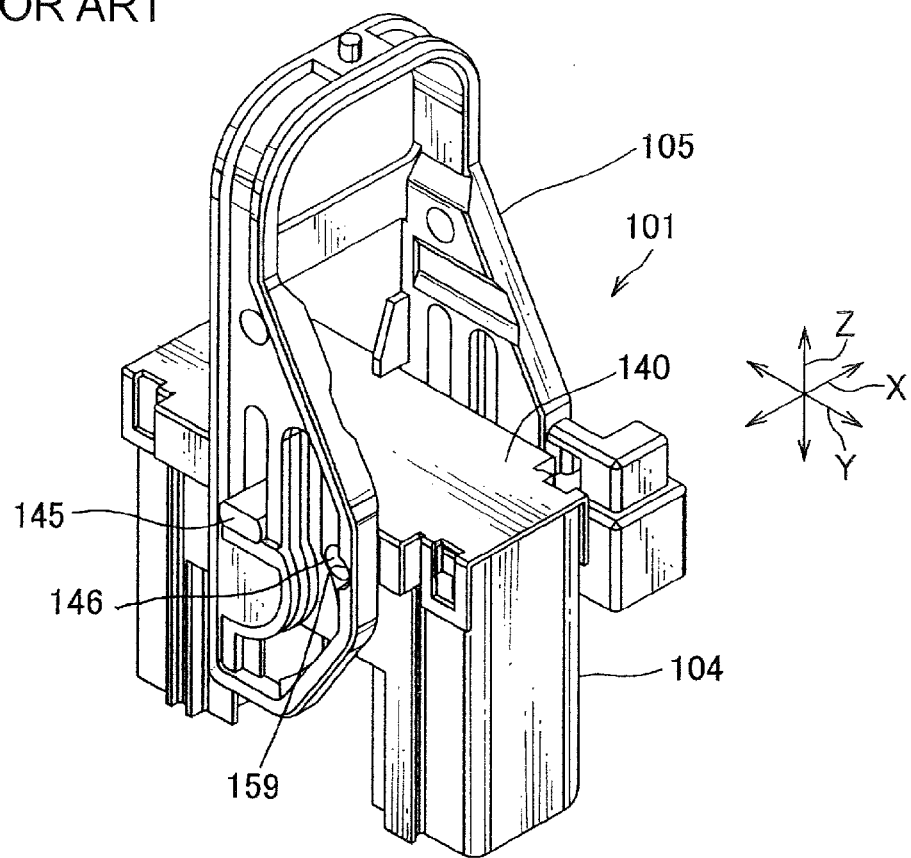
FIG. 12 is a perspective view showing a state that lever constructing the connector shown in FIG. 11 is positioned in a non-fitting position before rotating the lever toward the housing constructing the connector.
Figure 13:
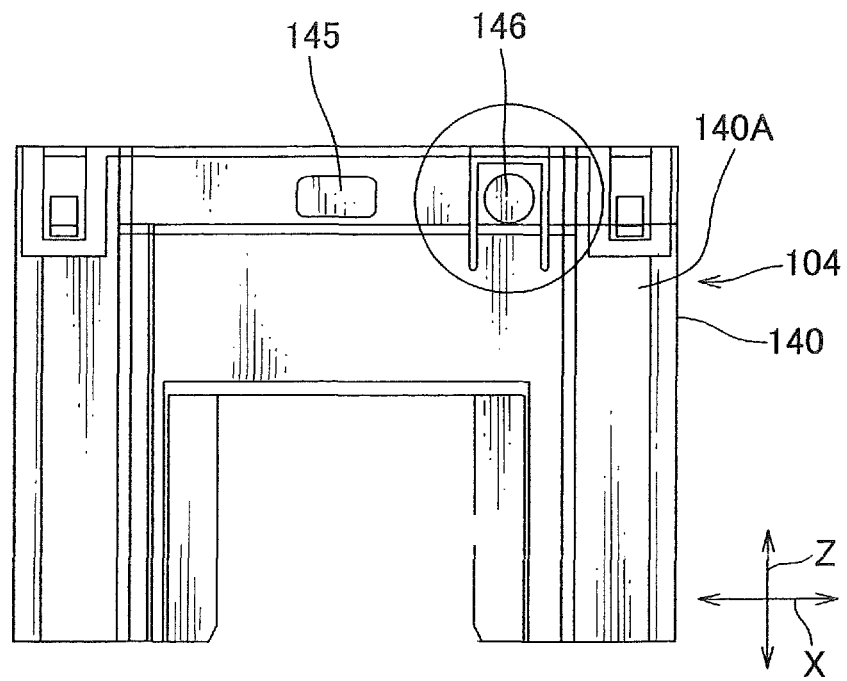
FIG. 13 is a side view showing the housing constructing the connector shown in FIG. 12.
Figure 14:
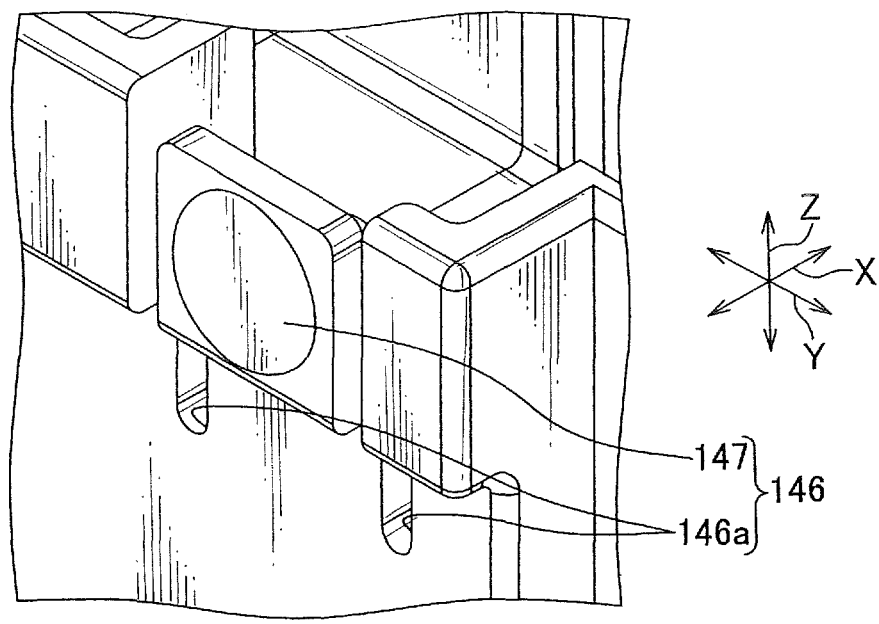
FIG. 14 is a perspective view showing the enlarged housing shown in FIG. 13.
Figure 15:
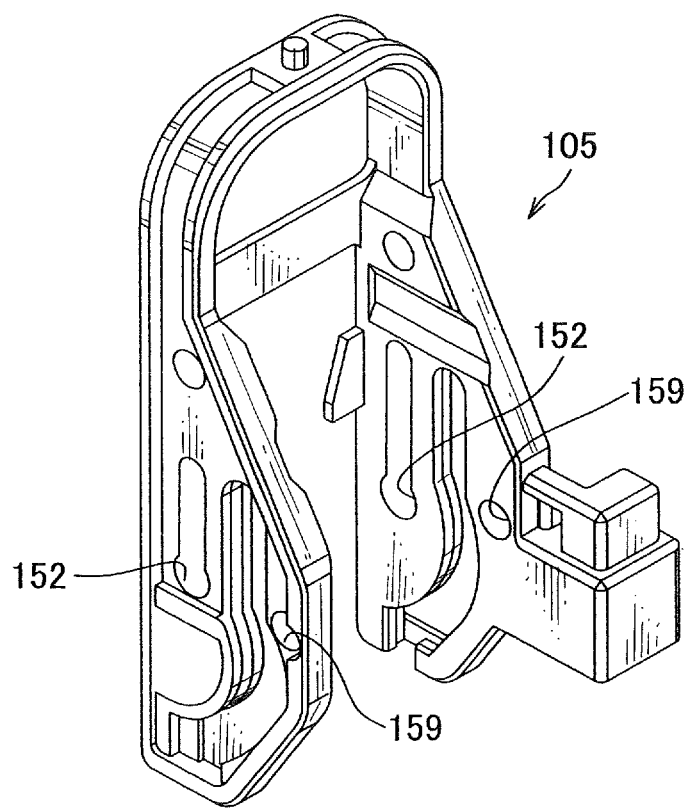
FIG. 15 is a perspective view showing the lever constructing the connector shown in FIG. 12.

In addition, when the lever 5 is slid along the housing 4 in a state that the lever 5 is positioned in the fitting position, as shown in FIG. 10, the abutting portion 44 abuts on the abutment receiving portion 56. When the lever 5 is further slid against the housing 4, the abutment receiving portion 56 is elastically deformed. Thereafter, the abutment receiving portion 56 is arranged over the abutting portion 44, and is elastically restored. Furthermore, the second projection 43 is positioned in the end portion of the guide groove 53 arranged in the lever 5 away from the hole 52. Also, the inside tube portion 71 arranged in the second housing 7 is inserted in the outer tube portion 58 arranged in the lever 5, and the first detection terminal is electrically connected to the second detection terminal. At the same time, the lever 5 is positioned in the fitting completion position.

When the lever 5 is positioned in the fitting completion position, the pair of the second detection terminals are electrically connected each other by the first detection terminal. For this reason, the power circuit is closed, and a current flows in the female terminal 3 from the male terminal 6.

According to the connector 1 as the lever fitting-type connector of the present invention, the connector 1 has the housing 4 having a main body 40 receiving the female terminal 3 and the pair of the rotation shaft 45 as the projection projecting from the main body 40; a rotatable lever 5 having holes 52 into which the rotation shafts 45 are inserted respectively, the lever 5 being rotated in a state that the rotation shafts 45 are inserted into the holes 52 from the non-fitting position before being fitted to the other connector 2 to the fitting position approaching the housing 4 and fitted to the other connector 2 by rotating around the rotation shaft 45; the engagement receiving portion 41 arranged in the rotation shaft 45 and extending from the rotation shaft 45 so as to sandwich the lever 5 between the main body 40 and the engagement receiving portion 41; the first overlapping position 54A arranged in the lever 5 and overlapped with the engagement receiving portion 41 at the non-fitting position; the second overlapping position 54B arranged in the lever 5 and overlapped with the engagement receiving portion 41 at the fitting position; and the engaging portion 55 arranged between the first overlapping position 54A and the second overlapping position 54B, projecting from the lever 5, and engaged to the engagement receiving portion 41. Therefore, even if the lock portion 146 arranged in the conventional lever fitting-type connector 101 are not provided, the lever 5 can be held in the non-fitting position. Thus, the connector 1 reducing the size thereof can be provided.

Furthermore, since the lever 5 is maintained in the non-fitting position without the lock portion 146 formed in the conventional lever fitting-type connector, work process and time for forming the projection 147 which projects from the main body 140 and is arranged in the main body 140 and the U-shaped groove 146a can be reduced. Thus, cost can be reduced.

Furthermore, the straight guide groove 53 communicated with the hole 52 is provided, and the pair of the second projections entering into the guide groove 53 in the fitting position is arranged in the main body 40. Therefore, since the second projection 43 is entered into the guide groove 53, a worker can visually confirm positioning the lever 5 at the fitting position. Thus, it is possible to prevent damage generated by a state that the connector 1 and the other connector 2 are incomplete from occurring. Furthermore, rotation returned to the non-fitting position from the fitting position can be regulated by entering the second projection 43 into the guide groove 53.

In the main body 40, the abutting portion projecting toward a direction away from the other connector is provided. On the other hand, in the lever 5, the pair of the abutment receiving portions which is elastically deformed in the direction away from the other connector (namely, the Z direction) is arranged. When the lever 5 is positioned in the fitting position, the abutment receiving portion 56 is arranged in the front side of the abutting portion 44 of the sliding direction (namely, the Y direction) in which the second projection 43 and the rotation shaft 45 are arranged in a line. Furthermore, when the lever 5 is slid along the sliding direction (namely, the Y direction), each the abutment receiving portion 56 abuts on the abutting portion 44. Thus, sliding the lever 5 along the sliding direction (namely, the Y direction) in which the second projection 43 and the rotation shaft 45 are arranged in line can be regulated.

Furthermore, when the pair of the abutment receiving portions 56 is positioned in the back side of the abutting portion 44 of the sliding direction (namely, the Y direction), the second projection 43 is positioned in the end portion of the guide groove 53 away from the hole 52. Therefore, the lever 5 is slid along the sliding direction (namely, the Y direction) in which the second projection 43 and the rotation shaft 45 as the projection are arranged in a line with a state that the lever 5 is positioned in the fitting position against the housing 4, and the abutment receiving portion 56 is positioned in the fitting completion position which is positioned in the back side of the sliding direction (namely, the Y direction) farther than the abutting portion 44. As a result, a worker can visually confirm positioning the second projection 43 in the end portion of the guide groove 53 away from the hole 52. Thus, damage before the lever 5 is positioned in the fitting completion position against the housing 4 can be prevented from occurring previously.

While, in the embodiment, the present invention is described, it is not limited thereto. Various change and modifications can be made with the scope of the present invention.

REFERENCE SIGNS LIST 1 connector (lever fitting-type connector)
2 another connector
3 female terminal (terminal)
40 main body
41 (a pair of) engagement receiving portions
44 abutting portion
45 (a pair of) rotation shafts (projection)
5 lever
52 hole
53 guide groove
54A first overlapping position
54B second overlapping position
55 engaging portion
56 abutment receiving portion
Arrow Z fitting direction (direction approaching the other connector)
Arrow Y longitudinal direction (sliding direction)

The invention claimed is:

1. A lever fitting-type connector comprising:
a housing having a main body receiving a terminal and a pair of projections projecting from the main body;
a rotatable lever having holes into which the pair of the projections is inserted respectively, the lever being rotated in a state that the projections are inserted into the holes from a non-fitting position before being fitted to another connector to a fitting position approaching the housing and fitted to the other connector by rotating around the projection;
an engagement receiving portion arranged in the projection and extending from the projection so as to sandwich the lever between the main body and the engagement receiving portion;
a first overlapping position arranged in the lever, wherein the engagement receiving portion is located at the first overlapping position when the lever is at the non-fitting position;
a second overlapping position arranged in the lever, wherein the engagement receiving portion is located at the second overlapping position when the lever is at the fitting position; and
an engaging portion arranged between the first overlapping position and the second overlapping position, formed on the lever, projecting from the lever, and engaged to the engagement receiving portion,
wherein a straight guide groove communicated with the hole is arranged in the lever, and a pair of second projections entering into the guide groove at the fitting position is arranged in the main body.

2. The lever fitting-type connector according to claim 1, further comprising:
an abutting portion projecting toward a direction away from the other connector and arranged between the second projection and the projection in the main body; and
a pair of abutment receiving portions arranged in the lever and elastically deformed in the direction away from the other connector, wherein when the lever is positioned in the fitting position, the pair of the abutment receiving portions is arranged in a front side of the abutting portion of a sliding direction in which the second projection and the projection are lined up, and then when the lever is slid along the sliding direction, the abutment receiving portion abuts on the abutting portion.

3. The lever fitting-type connector according to claim 2, wherein when the pair of the abutment receiving portions is positioned in a back side of the sliding direction of the abutting portion, the second projection is positioned in an end portion of the guide groove away from the hole.

* * * * *